United States Patent [19]

Ernst et al.

[11] 4,118,078
[45] Oct. 3, 1978

[54] LINEAR BALL BEARING INCLUDING LONGITUDINAL SLOT IN THE SLEEVE WITH BALL-RETAINING CAGE

[75] Inventors: Horst Manfred Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 779,693

[22] Filed: Mar. 21, 1977

[30] Foreign Application Priority Data

Mar. 26, 1976 [DE] Fed. Rep. of Germany ....... 2612935

[51] Int. Cl.² .................. F16C 29/06; F16C 31/06
[52] U.S. Cl. .................. 308/6 C; 64/23.7; 308/201
[58] Field of Search ............... 308/6 C, 6 R, 185, 201, 308/189, 237; 64/23.7, 23

[56] References Cited

U.S. PATENT DOCUMENTS

| 3,403,951 | 10/1968 | Bailey | 308/201 |
| 3,464,745 | 9/1969 | Schaeffler | 308/6 C |
| 3,582,160 | 6/1971 | Schutz | 308/6 C |

FOREIGN PATENT DOCUMENTS 1,896,804  8/1963  Fed. Rep. of Germany .......... 308/6 C

*Primary Examiner*—Trygve M. Blix
*Assistant Examiner*—Douglas C. Butler
*Attorney, Agent, or Firm*—Daniel M. Rosen

[57] ABSTRACT

A linear motion ball bearing including an outer sleeve, a cylindrical ball-retaining cage within the sleeve with continuous raceways defined between the sleeve and cage, and a plurality of balls in these raceways, each raceway comprising a loaded axial race and a parallel unloaded return race, and two curved turn-around races connecting the axial races. The sleeve has, in the region adjacent each unloaded race, a longitudinal slot having a width greater than the diameter of the balls, and the cage having projections along the unloaded races for retaining balls from falling out of these races.

7 Claims, 2 Drawing Figures

LINEAR BALL BEARING INCLUDING LONGITUDINAL SLOT IN THE SLEEVE WITH BALL-RETAINING CAGE

BACKGROUND OF THE INVENTION

The present invention is in the field of linear ball bearings consisting of a cage with a plurality of ball guides distributed over its periphery, each guide having two straight races running parallel to the axis of the bearing and two semicircular races connecting the straight races, a cylindrical sleeve slipped over the cage, and a plurality of balls. In the region of the straight races in which the balls run back unloaded, the sleeve is provided with a longitudinal slit extending radially through the sleeve for each return race.

The linear ball bearings, also called drawn cup linear ball bearings having a thin-walled design, are known and include continuous longitudinal slits having a width which is smaller than the ball diameter. The balls are thus guided into the return zone by the edges of these longitudinal slits, which may continue into curved sections in which the balls are rerouted into the bearing zones as in DT-AS No. 1,266,574 which corresponds to U.S. Pat. No. 3,265,449. Also, there is the possibility of enlarging the sleeves in diameter at both axial ends in the region of the semicircular races, so that the turn-arounds are covered toward the outside as in DT-AS No. 1,262,691 which corresponds to U.S. Pat. No. 3,464,745. In these known embodiments the balls in each section of the race are always in contact with the sleeve, which leads to increased noise and wear, particularly in the regions in which the balls are not loaded. This is especially the case in the regions where the balls emerge from the loaded zone with the greatest speed.

One object of the present invention is to provide a ball bearing sleeve for use in bearings of the type initially described, in which the production of noise and wear is largely prevented.

SUMMARY OF THE INVENTION

One object of this invention, to reduce noise and wear, is achieved in the region of the turn-around and-/or return races, by virtue of the sleeve being set back in relation to the balls, and the balls in these regions being held and guided exclusively by the cage. In a preferred embodiment of the invention the longitudinal slits in the sleeve have a width which is greater than the diameter of the balls, which serves to prevent any contact of the balls with the sleeve in the turn-around races. According to additional features of the invention, the longitudinal slit may continue into the turn-around races forming a C-shape, or the sleeve at both ends in the region of the semicircular races, may be recessed radially outward in relation to the inner bore in the midsection of the sleeve.

These means pursuant to the invention, ensure that the balls in the straight return race and, alternatively, if any, in the semicircular races, are in contact exclusively with the cage and thus not with the sleeve. The cage may moreover be made preferably of synthetic material, for reducing noise as well as wear. By an additional feature of the invention to prevent the balls in the region of the longitudinal slits from falling out, the straight races and/or the turn-around races in the cage are provided at their edges with springy projections. The recesses at either end of the sleeve in the region of the semicircular races may be designed as ring-shaped recesses, but also there is the possibility of providing a plurality of segmental recesses distributed on the periphery.

A preferred embodiment of the present invention is described below and illustrated in greater detail by the accompanying drawings.

DETAILED DESCRIPTION OF THE PREFERRED EMBODIMENT

Figure 1:
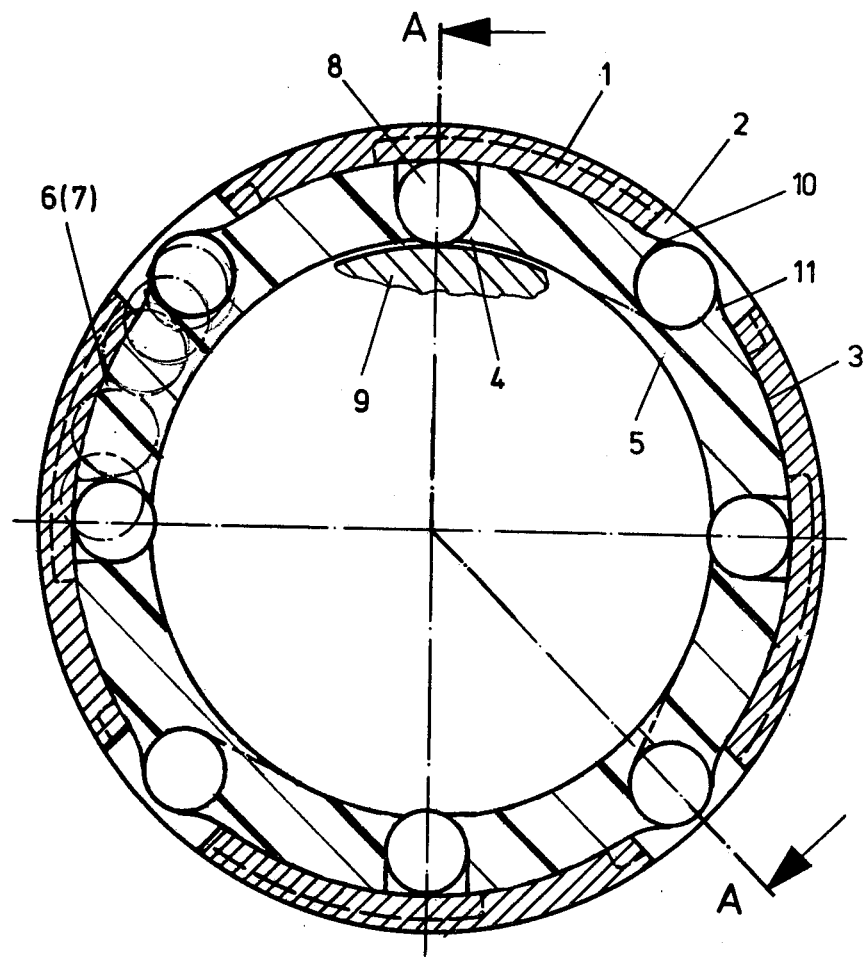
FIG. 1 shows a cross-section through a linear ball bearing pursuant to the invention.

The preferred new linear ball bearing consists of a sleeve 1 having a plurality of longitudinal slits 2, distributed on the periphery. Within sleeve 1 is inserted a cage 3 having a plurality of ball guides distributed over its periphery. Of these guides, each consists of two straight races 4 and 5 running parallel to the axis of the bearing and two semicircular races 6 and 7 linking races 4 and 5. Races 4 are bearing zones, designed such that the balls 8 may be in contact with the inner wall of the sleeve 1 as well as with the outer surface of the shaft 9. In connection therewith the balls 8 are routed through the semicircular turn-around zones 6, 7 into the so-called return race 5, where the balls have no contact with the shaft 9. In order to prevent any contact with the sleeve 1, the longitudinal slits 2 in this embodiment are designed with a width which is greater than the diameter of the balls 8. To prevent the balls in this region from falling out, the cage is provided at the edges of the straight race 5 with springy or resilient projections 10 and 11.

Figure 2:
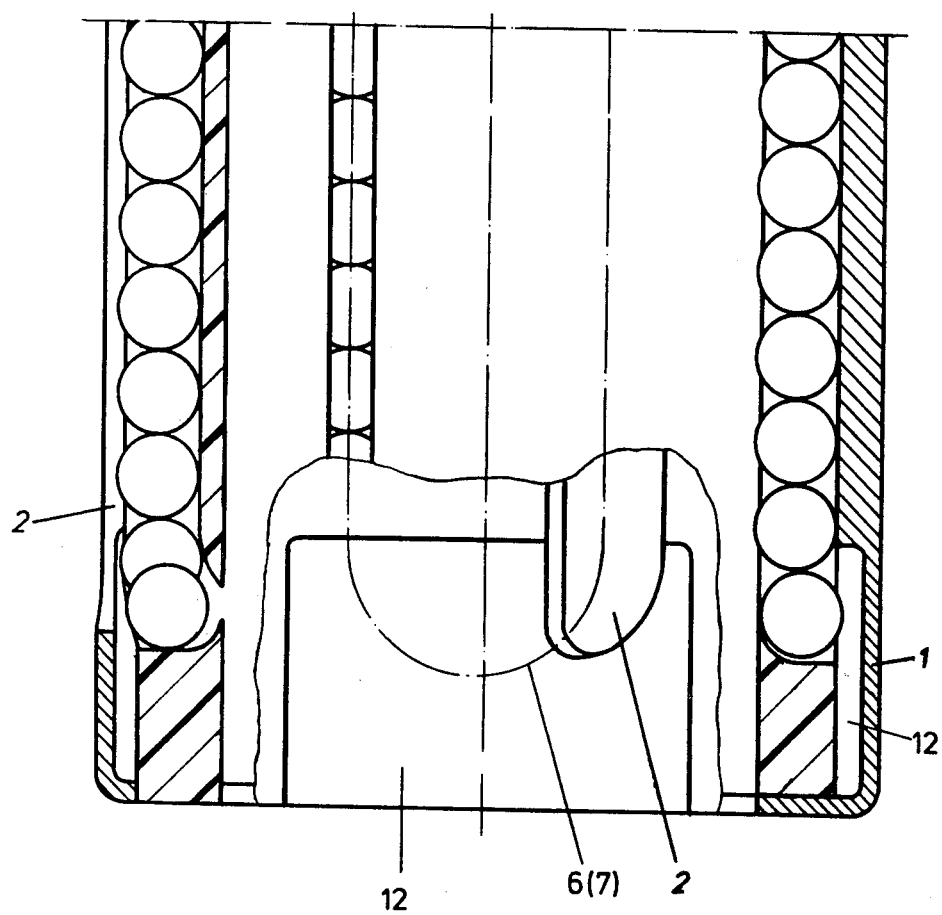
FIG. 2 shows a part of the longitudinal section along line A—A of FIG. 1.

As may be seen particularly in FIG. 2, the sleeve 1, in the region of the semicircular races 6 and 7, is provided with sections 12 which have recessed or greater inside diameter in relation to the midsection of the sleeve, such that no loadtransmitting contact of the balls can be effected on these sections of the sleeve 1. The balls here are merely held and guided in the cage by the semicircular races.

The assembly of this ball bearing pursuant to the invention may be carried out in a known manner, such that the balls are first placed in the cage and the cage inserted, together with the balls, into the sleeve. There is an alternative possibility of inserting the cage in the sleeve, and snapping the balls in from the outside through the longitudinal slits, which become spread apart by overcoming the elastic force of the projections 10, 11 of the cage.

The present invention is not limited to the embodiment represented. Other variations, alternatives and modifications within the scope of the invention will be apparent to those skilled in the art.

What is claimed is:

1. In a linear ball bearing operable with a shaft for relative axial movement therewith, the bearing including an outer sleeve, a cylindrical ball-retaining cage situated within the sleeve, said cage having a plurality of continuous raceways, each of which includes (a) two parallel and axial races, one being a loaded zone wherein balls contact both the sleeve and the shaft, and the other being an unloaded return zone, and (b) two curved turn-around races connecting adjacent ends of said axial races, and a plurality of balls substantially filling said raceways, said unloaded return zone being defined by a slot extending axially in said sleeve and radially through said sleeve, the improvement in combination therewith, wherein said sleeve has a circumferential surface facing said cage, said surface comprising regions adjacent said loaded axial zone and said turn-around races of said cage, and in at least one of said regions said sleeve surface is recessed radially outward from said cage, thereby defining a space between said recessed region and the balls therein, and said cage comprises exclusive ball-restraining means for restraining said balls in said recessed region from contacting said recessed surface of the sleeve.

2. A bearing according to claim 1, wherein said slot in said sleeve has a width dimension in the circumferential direction which is greater than the diameter of said balls.

3. A bearing according to claim 2, wherein at least one of said turn-around races connected to each return race is also defined by a slot similar to and continuous with said slot of said return race.

4. A bearing according to claim 2, wherein both of said turn-around races connected to each return race are also defined by slots similar to and continuous with said slot of said return race.

5. A bearing according to claim 1, wherein said regions of the sleeve surface adjacent both turn-around races are recessed as defined.

6. A bearing according to claim 1, wherein said return and turn-around races each comprise edges along their lengths defining the width of said races and said ball-restraining means comprises resilient projections extending from said edges toward said sleeve, said projections defining between them a space having width less than the diameter of said balls.

7. A bearing according to claim 1, wherein said curved turn-around races are seim-circular.

* * * * *

UNITED STATES PATENT AND TRADEMARK OFFICE
CERTIFICATE OF CORRECTION

PATENT NO. : 4,118,078
DATED : October 3, 1978
INVENTOR(S) : Horst Manfred Ernst, et al It is certified that error appears in the above–identified patent and that said Letters Patent are hereby corrected as shown below:

Column 4, line 18; Change "seim" to --semi--.

Signed and Sealed this

Sixth Day of February 1979

[SEAL]

Attest:

RUTH C. MASON
Attesting Officer

DONALD W. BANNER
Commissioner of Patents and Trademarks